Patented Sept. 7, 1937

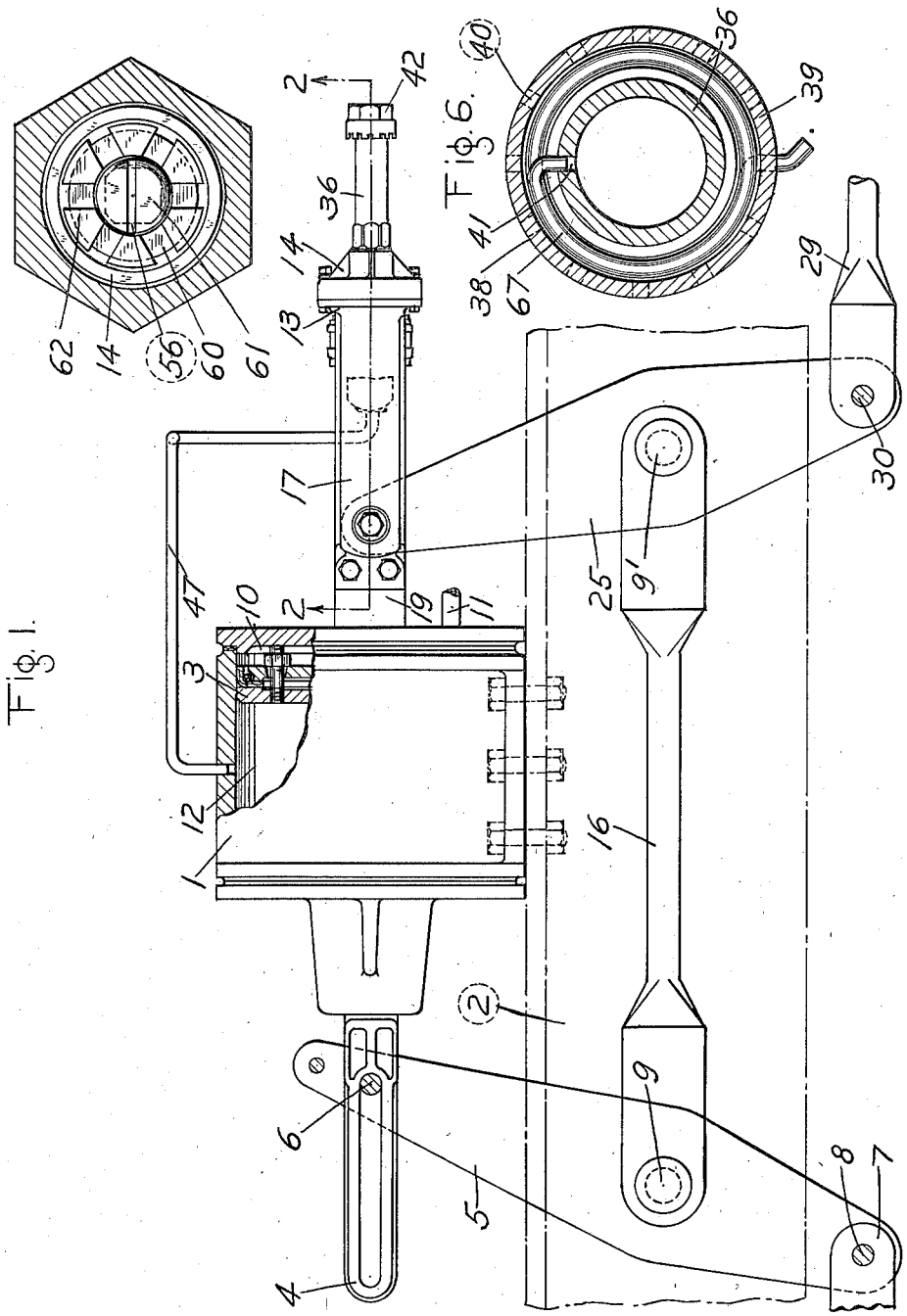

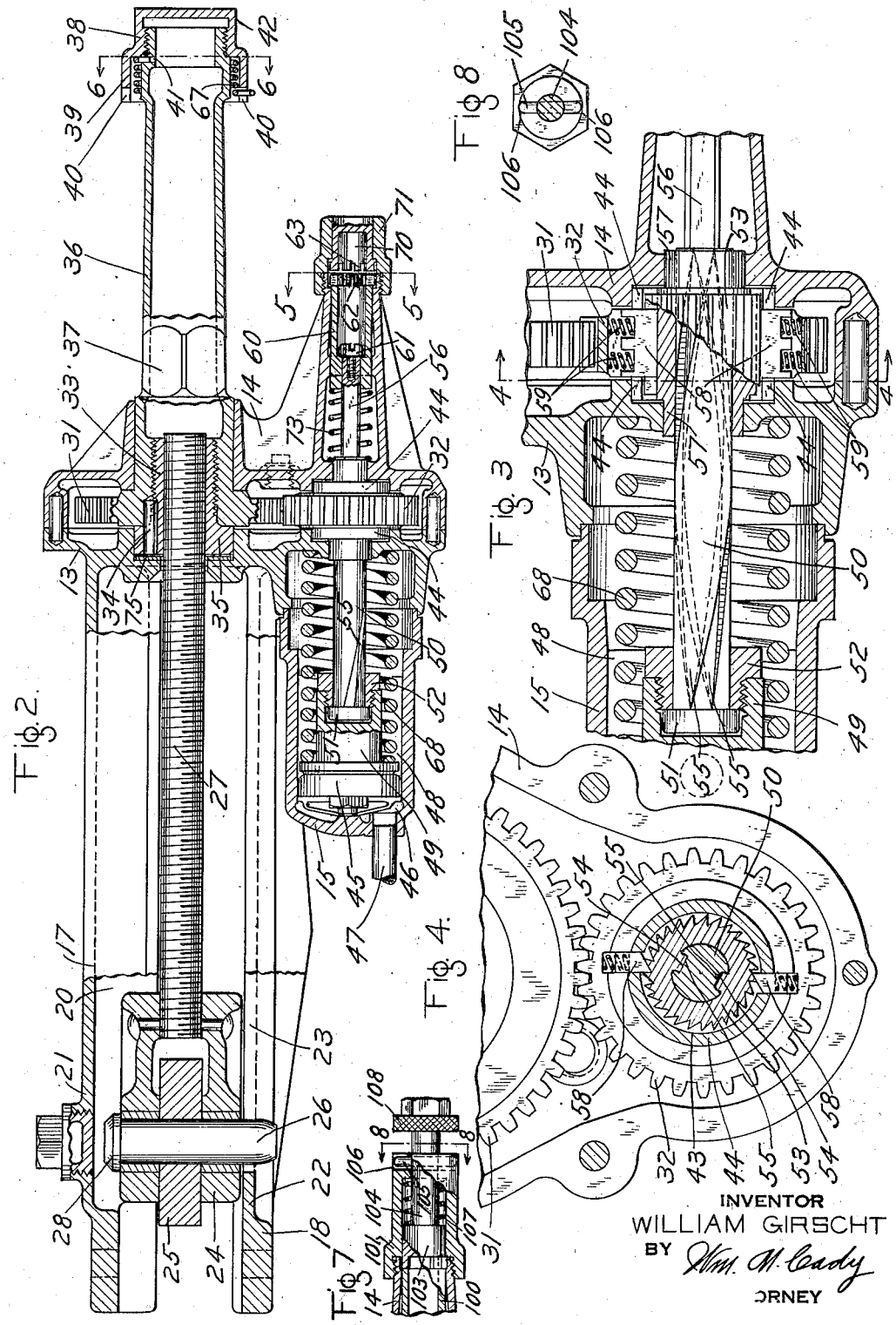

2,092,391

UNITED STATES PATENT OFFICE 2,092,391

SLACK ADJUSTER

William Girscht, St. Louis, Mo., assignor to The American Brake Company, St. Louis, Mo., a corporation of Missouri Application April 11, 1935, Serial No. 15,745

14 Claims. (Cl. 188—203)

This invention relates to slack adjusters adapted to automatically take up slack in railway brake riggings caused by wear of the brake shoes and other parts and more particularly to a slack adjuster of the type which is supplied with fluid under pressure from the brake cylinder when the brake cylinder piston has moved out a predetermined distance in applying the brakes and which, when the fluid under pressure is released therefrom in releasing the brakes, will operate to take up slack.

Slack adjusters of the above mentioned type are each provided with a slack take-up mechanism and a fluid pressure controlled motor or cylinder mechanism for effecting the operation of the slack take-up mechanism. The cylinder mechanism has heretofore been disposed at right angles to the slack take-up mechanism, and due to this and to the fact that the cylinder portion is of considerable length, the overall dimensions of the slack adjuster are such as to render it difficult to mount the adjuster where the available space is limited, this being especially the case where the slack adjuster is to be mounted on a car truck.

The available space on the truck for mounting the brake cylinder and slack adjuster is necessarily very limited and it has been found exceptionally difficult to properly mount the slack adjuster, and at the same time adhere to the usual very restricted clearance limitations about the truck.

The principal object of the invention is to provide an improved slack adjuster, of the aforementioned type, in which the cylinder mechanism is disposed in parallel relation to the take-up mechanism instead of at an angle thereto so as to require considerably less space for mounting than would otherwise be the case.

Another object of the invention is to provide a slack adjuster of the aforementioned type having novel means for effecting the operation of the adjuster to take up slack or for adjusting the brake rigging when worn shoes are replaced by new shoes.

A further object of the invention is to provide a slack adjuster of the aforementioned type having a novel cylinder mechanism for effecting the operation of the take-up mechanism.

Other objects and advantages will appear in the following more detailed description of the invention.

In the accompanying drawings, Fig. 1 is a plan view, partly in section, of a portion of a brake rigging embodying the invention, a portion of a brake cylinder and slack adjuster support being shown in dot and dash lines; Fig. 2 is an enlarged sectional view of the slack adjuster taken on the line 2—2 of Fig 1, the brake cylinder being omitted and portions of several of the parts of the adjuster being shown in elevation to more clearly illustrate the invention; Fig. 3 is an enlarged fragmentary detail sectional view taken on the line 2—2 of Fig. 1 and illustrates portions of the cylinder mechanism in greater detail than it is illustrated in Fig. 2; Fig. 4 is a detail cross sectional view taken on the line 4—4 of Fig. 3; Fig. 5 is an enlarged detail cross sectional view taken on the line 5—5 of Fig. 2; Fig. 6 is a detail cross sectional view taken on the line 6—6 of Fig. 2; Fig. 7 is a composite elevational and sectional view of a modification of a portion of the slack adjuster, and Fig. 8 is a cross sectional view taken on the line 8—8 of Fig. 7.

In Fig. 1 of the drawings the improved slack adjuster is shown mounted on a brake cylinder 1 which is secured to fixed member 2 which may constitute a part of a car body or of a truck.

The brake cylinder may be of the usual construction comprising a cylinder portion containing a piston 3 adapted to actuate a push rod 4 which, in the present embodiment of the invention, is operatively connected to the outer end of a brake cylinder lever 5 by means of a pin 6, the inner end of the lever being operatively connected to one end of a tension rod 7 by means of a pin 8. Although not shown, the other end of the tension rod may be operatively connected, in any desired manner, to the other parts of the truck brake leverage system.

At one side of the brake cylinder piston 3 is a chamber 10 which is in communication with the usual brake cylinder pipe 11 through which fluid is adapted to be supplied to the chamber 10 to effect an application of the brakes and from which fluid is adapted to be vented from the chamber to effect a release of the brakes. At the other side of the piston 3 is a chamber 12 which is in constant communication with the atmosphere in the usual manner.

The slack adjuster comprises a take-up portion, a cylinder mechanism for actuating the take-up portion and a casing comprising a body section 13, a cap section 14 and a cylinder section 15 all of which are suitably secured together.

The body portion of the casing comprises spaced parallel upper and lower arms 17 and 18 respectively which, in the present embodiment of the invention, are secured to a lug 19 projecting outwardly from the pressure head of the brake cylinder 1.

The upper arm 17 comprises spaced downwardly depending guide flanges 20 which are integrally connected together throughout the length of the arm by an upwardly bowed web 21. The lower arm 18 comprises a flat web 22 which is provided with a longitudinally extending slot 23.

Interposed between the arms 17 and 18 is a cross-head 24 which is secured at one end to the outer end of a fulcrum lever 25 by means of a pin 26 and which at its other end is secured to the outer end of an adjusting screw 27 by means of a rivet or any other suitable securing means. The lower end of the pin extends into the slot 23 provided in the web 22 and this pin, together with the flanges 20 of the arm 17, serve to guide the cross-head as it is moved longitudinally of the arms.

The upper end of the pin 26 is provided with a head 28 which engages the upper surface of the cross-head. It will be noted that clearance space provided between the upper surface of the head 28 and the lower surface of the web 21 is less than the distance from the lower end of the pin to the upper surface of the web 22 so that the web 21 prevents the pin from being jarred or otherwise unintentionally moved out of guiding relation with the web 22 and also out of securing position with relation to the cross-head and associated fulcrum lever 25, thus the pin is maintained in its proper position without the use of a cotter pin or any other securing means at the lower end of the pin.

The inner end of the fulcrum lever 25 is connected to the inner end of a tension rod 29 by means of a pin 30 and this lever is operatively connected, intermediate its ends, to the brake cylinder lever 5 by means of a connecting rod 16 and pins 9 and 9'. Although not shown, the outer end of the rod 29 may be connected in any desired manner to the other parts of the brake leverage system.

When the main and cap sections of the casing are secured together they define a gear chamber which contains meshing gear wheels 31 and 32, the gear wheel 31 constituting a part of the take-up mechanism and the gear wheel 32 constituting a part of the cylinder mechanism.

The gear wheel 31 is provided with a central bore within which an adjusting nut 33 has screw-threaded connection with the gear wheel, said nut being positively secured to the gear wheel by means of a pin 34 and having a circular head 35 which is journalled in a suitable bearing carried by the main casing section.

The adjusting nut 33 is provided with a central bore within which the inner end of the adjusting screw 27 has a screw-threaded connection with the adjusting nut.

Extending outwardly from the right hand side of the gear wheel 31, and preferably integral with the wheel, is a hollow sleeve 36 for the reception of the adjusting screw 27. This sleeve extends through and beyond the cap section 14 of the casing and, adjacent the gear wheel, is journalled in a suitable bearing carried by the cap section. Exteriorly of the cap section, and adjacent the bearing portion thereof, the sleeve is provided with a hexagonal portion 37 which is adapted to be engaged by a wrench or any other suitable tool when it is desired to manually operate the slack adjuster.

The outer end of the sleeve is open and is adapted to be closed by a stop cap 38 which has screw-threaded connection with the sleeve, said cap constituting a stop for limiting the movement of the adjusting screw 27 in the direction toward the right hand. The cap 38 is provided with an annular flange 39 having a plurality of notches 40 formed in the end thereof. The flange 39 is of greater diameter than the adjacent portion of the sleeve, thus providing a space between the inner surface of the flange and the outer surface of the adjacent portion of the sleeve. Contained in this space and surrounding the sleeve is a torsion spring 67 having one end engaging the flange 39 within any one of the notches 40 and having the other end engaging the sleeve within an opening 41. This spring is so arranged that it will prevent the cap from jarring loose from the sleeve but will permit the cap to be slacked off by the use of wrench or other suitable tool applied to the outer hexagonal portion 42 of the cap. When the wrench is removed the spring acts to turn the cap so that it will assume its normal position in which it is shown in Fig. 2. The purpose of this cap arrangement will be hereinafter more fully described.

The gear wheel 32 of the cylinder mechanism is provided with a central opening 43 which at each side of the wheel is defined by bearing sleeves 44 which are suitably journalled in bearings carried by the main and cap sections of the casing.

Contained in the cylinder section 15 of the casing is a piston 45, at one side of which there is a piston chamber 46 which is connected through a pipe 47 to the chamber 12 of the brake cylinder 1 when the brakes are released. At the other side of the piston is a chamber 48 containing a coil spring 68 which is interposed between and operatively engages the piston and the main casing section.

The piston 45 is provided with a rearwardly extending portion 49 to which one end of a piston rod 50 is secured so that it is adapted, under certain conditions hereinafter described, to rotate relative to the piston. In the present embodiment of the invention this end of the piston rod is provided with a circular head 51 which is loosely contained in a recess formed in the portion 49 of the piston. Adjacent the head 51 the piston rod is journalled in a sleeve nut 52 which has screw-threaded connection with the portion 49 of the piston and which cooperates with the head 51 to prevent separation of the piston rod from the portion 49.

The piston rod 50 extends through a central opening in a ratchet wheel 53 having lugs or teeth 54 which are constantly in engagement with the piston rod within right hand spiral grooves 55 which extend from the head 51 or a point adjacent thereto to the right hand side of the ratchet wheel 53. The right hand end portion 56 of the piston rod extends beyond the ratchet wheel 53 and is preferably square in cross-section.

The ratchet wheel 53 extends through the opening 43 in the gear wheel 32 and is provided with hub portions 57 which are suitably journalled in bearings carried by the main and cap sections of the casing. The ratchet teeth of the ratchet wheel engage either one or the other of two ratchet pawls 58 which are slidably carried by the gear wheel 32 and which are urged into operative engagement with the ratchet wheel by springs 59. It will be noted from an inspection of Fig. 4 that when one of the pawls is in operative engagement with the driving face of one of the ratchet teeth of the ratchet wheel the other pawl will contact with the back of another tooth midway between its root and its end. It will be seen that by reason of this arrangement, finer increments of adjustment may be made than would be the case if a single pawl were employed or if both pawls simultaneously engaged driving faces of the teeth.

The square end portion 56 of the piston rod slidably fits in a square opening in the inner end of a clutch member 60 which is rotatably and slidably mounted in the cap section of the casing. Secured to the square portion 56 by means of screw threads is a member having a head 61 which projects beyond the sides of the portion 56, the projecting portion of the head constituting a shoulder which, as show in Fig. 2 of the drawings, is adapted to engage a shoulder formed on the clutch member 60.

The face of the clutch member 60 is provided with spaced radially arranged clutch teeth 62 which are adapted to engage radially arranged clutch teeth 63 carried by a stationary clutch or locking member 70 secured to a cap 71 having screw-threaded connection with the cap section of the casing. Contained in the cap section of the casing and surrounding the square portion 56 of the take-up piston rod is a spring 73 which at one end is seated on a shoulder formed on the cap section of the casing and at the other end operatively engages the inner end of the clutch member 60 and which, at all times, tends to urge the clutch in the direction toward the right hand.

With the take-up piston 45 in its outer position as shown in Fig. 2, the spring 68, acting through the medium of the piston 45, piston rod 50 and head 61 of the member secured to the end of the piston rod, maintains the clutch member 60 out of locking engagement with the clutch member 70 against the opposing pressure of the spring 73.

From Figs. 1, 2 and 4 of the drawings it will be seen that the cylinder mechanism is arranged directly below the take-up mechanism and in parallel relation therewith, thus eliminating to a great extent, the difficulty of positioning the slack adjuster when clearance space is limited.

In operation, when the brake shoes or other parts of the brake rigging become worn to such an extent that in effecting an application of the brakes, the brake cylinder piston 3 moves outwardly beyond the communication 47, fluid under pressure flows from the piston chamber 10 by way of communication 47 to the piston chamber 46 of the slack adjuster, causing the piston 45 and thereby the piston rod 50 to move in the direction toward the right hand, compressing the spring 68.

Upon the initial movement of the piston rod 50 in this direction, the compressed spring 73 acts to move the clutch member 60 in the same direction, causing the teeth 62 of this clutch member to engage the teeth 63 of the stationary clutch member 70, thus locking the clutch member 60 and consequently the piston rod against rotation.

Since the piston rod is prevented from rotating it will, due to its engagement within the grooves 55 of the teeth 54 of the ratchet wheel cause the ratchet wheel to rotate in a counter-clockwise direction relative to the gear wheel 32, the ratchet pawls 58 idling over the ratchet teeth.

Now, when in releasing the brakes, fluid under pressure is vented by way of pipe 11 from the brake cylinder piston chamber 10, the brake cylinder piston 3 is caused to move to its normal release position in the usual manner, the piston, in its traverse, first cutting off the connection between the piston chamber 10 and the communication 47 leading to the piston chamber 46 of the slack adjuster cylinder mechanism and then opening the communication 47 to the brake cylinder chamber 12 which is connected to the atmosphere, so that fluid under pressure is vented from the piston chamber 46 to the atmosphere.

With the piston chamber thus vented, the compressed spring 68 acts to return the piston 45 and thereby the piston rod 50 to normal position as shown in Fig. 2. The compressed spring 73, for the greater portion of the travel of the take-up piston 45, acts to maintain the clutch member 60 in its extreme right hand or locked position so that the piston rod in its return is prevented from rotating and therefore causes the ratchet wheel 53 to rotate in a clockwise direction Either one or the other of the pawls 58 will be in operative engagement with the driving face of a ratchet tooth of the ratchet wheel, and due to this, the gear wheel 32 will be driven in a clockwise direction and as a consequence the gear wheel 31 will be caused to rotate in the opposite direction.

Since the adjusting nut 33 rotates with the gear wheel 31, the adjusting screw 27 will, due to its threaded engagement with the nut 33, move toward the right hand and thereby cause the slack in the brake rigging to be taken up.

When the take-up piston 45 nears the end of its return travel the head 61 of the member secured to the end of the piston rod 50 engages the clutch member 60 and causes the clutch member to move to its unlocked position against the action of the spring 73 as shown in Fig. 2 in which position the clutch member is free to rotate.

It will here be noted that when the slack is being taken up, the gear wheel 31 and adjusting nut 33 tend to move toward the left hand and to take this end thrust and to provide a bearing having high wear resisting qualities and which will therefore materially contribute to the free rotation of the adjusting nut and gear wheel 31, a thrust bearing 75 in the form of a flat phosphor bronze washer is interposed between the adjusting nut 33 and the main section of the casing.

If for any reason it should be desired to operate the slack adjuster manually to take up slack, the gear wheel 31 is rotated in a counterclockwise direction, by means of a wrench or other suitable tool which may be applied to the hexagonal portion 37 of the sleeve 36 and the adjusting nut 33, secured to the gear wheel, will cause the screw 27 to move in the direction toward the right hand and therefore take up the slack in the brake rigging. It will be noted that when the gear wheel 31 is thus rotated the gear wheel 32 meshing therewith will be rotated in the opposite direction, and since the ratchet pawls 58 will ratchet or idle over the ratchet teeth of the ratchet wheel 53, the desired adjustment may be made.

When worn brake shoes are replaced by new ones, it is necessary to move the cross-head 24, by means of the screw 27, in the direction toward the left hand to substantially the position in which it is shown in Fig. 2, and in order to do this the gear wheel 31 and adjusting nut 33 must be manually rotated in a clockwise direction by means of a wrench applied to the portion 37 of the sleeve 36.

When the gear wheel 31 is rotated in this direction, it drives the gear wheel 32, ratchet wheel 53, piston rod 50 and clutch member 60 in the opposite direction. It has hereinbefore been mentioned that the connection between the piston 45 and rod 50 is such that the rod is rotatable relative to the piston, so that as the rod is rotated the piston will not act to resist movement of the several movable parts of the slack adjuster as would be the case if rotary movement of the rod relative to the piston were not permitted.

Should the permissible travel of the screw 27 and cross-head 24 become exhausted during an automatic adjusting operation, the final adjusting stroke of the piston will not be completed, as the end of the screw 27 will then contact with the stop cap 38 located at the outer end of the sleeve 36 so that further automatic rotation of the screw will be prevented and, as a consequence, the piston will not be returned to its normal position. In such a case, the operator, by the use of a wrench applied to the hexagonal portion 42 of the cap, slacks back the cap against the torsion of the spring, which permits the screw 27 to move in a direction toward the right hand a sufficient distance for the piston 45 to complete its adjusting stroke. When the screw 27 is being moved back toward its normal position, the spring 67 acts to rotate the stop cap to its normal position as shown in Fig. 2, so that the cap cannot be left partly unscrewed.

In Figs. 7 and 8 a modification of the clutch mechanism is illustrated and which differs from the clutch mechanism in Fig. 2 in that it is manually operative instead of automatically to permit the rotation of the piston rod 50 when the adjusting nut 33 is rotated manually to move the adjusting screw toward the left hand to reset the mechanism.

In this modification, the square end portion 56 of the piston rod 50 slidably fits in the square opening in a clutch member 100 which is similar to the clutch member 60 and which is rotatably but not slidably mounted in the cap section of the casing. The right hand end of the clutch member is enlarged slightly to provide an annular bearing shoulder which engages an annular shoulder formed on the cap section. The clutch member is held in place by a clutch cap 101 which has screw-threaded connection with the cap section 14 and which contacts with the face of the clutch member as shown in Fig. 7.

The face of the clutch member 100 is provided with spaced radially arranged clutch teeth which are adapted to engage with correspondingly arranged clutch teeth carried by a clutch or locking member 103 slidably mounted in the clutch cap 101 to permit the clutch teeth of the member 103 to be moved into and out of locking engagement with the teeth of the clutch member 100.

The clutch member 103 is provided with a stem 104 which extends through an opening in the cap section 14 of the casing, and, exteriorly of said section, is provided with a pin 105 which is disposed at right angles to the stem and which normally engages the clutch cap 101 within notches 106 to prevent rotation of the stem 104 and thereby the clutch member 103. Contained in the clutch cap is a spring 107 which, at all times, tends to urge clutch member 103 and stem 104 in the direction toward the left hand to maintain the teeth of the clutch member in locking engagement of the teeth of the clutch member 100 and at the same time maintain the pin 105 in locking engagement with the clutch cap as shown in Figs. 7 and 8.

The outer end of the clutch stem is provided with a circular grip member 108 having a knurled edge, which member is adapted to be grasped by an operator for moving the clutch member 103 and stem 104 to their unlocking position and for then rotating the stem so that the locking pin 105 will engage the outer surface of the clutch cap and hold the stem and clutch member in their unlocked position.

It will be noted that since the clutch stem 104 and clutch member 103 are locked against rotation by reason of the engagement of the pin 105 with the clutch cap 101, and the clutch member 103 is in locking engagement with the clutch member 100, said clutch member 100 will, due to its connection with the square end 56 of the piston rod, prevent rotation of the rod when the take-up mechanism is operated automatically to take up slack.

Should the permissible travel of the screw 27 and crosshead 24 become exhausted during an automatic adjusting operation, the final adjusting stroke of the piston will not be completed, as the end of the screw 27 will then contact with the stop cap 38 located at the outer end of the sleeve 36 so that further automatic rotation of the screw will be prevented and, as a consequence, the piston will not be returned to its normal position. Due to this, the force of the spring 68, transmitted through the piston rod 50 and clutch member 100 causes a binding action to be set up between the member 100 and the locked clutch member 103 which may be severe enough to prevent the clutch stem 104 and clutch member 103 from being moved to their unlocking position by means of the grip member 108 alone. In such a case, the operator, by the use of a wrench applied to the hexagonal portion 42 of the cap, slacks back the cap against the torsion of the spring which permits the screw 27 to move in a direction toward the right hand a sufficient distance for the piston 45 to complete its adjusting stroke, thereby relieving the interengaging locking parts of the clutch members 100 and 103 and clutch stem 104 of the force of the spring 68. The stem 104 and clutch member 103 are now easily moved to unlocking position. When the screw 27 is being moved back toward its normal position, the spring 67 acts to rotate the stop cap to its normal position as shown in Fig. 2, so that the cap cannot be left partly unscrewed.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake slack adjuster, in combination, a slack adjuster screw, a member rotatable relative to said screw and cooperating therewith to actuate the screw to take up slack, gearing for rotating said member, and means operable to actuate said gearing, said means comprising a screw member automatically operable relative to the gearing to an adjusting position in effecting an application of the brakes and being automatically operable from said position to impart rotary motion to the gearing to adjust the screw upon effecting a release of the brakes.

2. In a brake slack adjuster, in combination, a slack adjuster screw, a member rotatable relative to said screw and cooperating therewith for actuating the screw to take up slack, gearing operative to rotate said member, a rotatable ratchet wheel, a screw member movable longitudinally in one direction for rotating the ratchet wheel in one direction and movable longitudinally in the opposite direction for rotating the ratchet wheel in the opposite direction, and means cooperating with the gearing and ratchet wheel constituting a driving connection between the ratchet wheel and gearing when the ratchet wheel is rotated in said opposite direction, said means permitting the ratchet wheel to rotate relative to the gearing when driven in the first mentioned direction.

3. In a brake slack adjuster, in combination, a slack adjuster screw, a member rotatable relative to said screw and cooperating therewith for actuating the screw to take up slack, gearing operative to rotate said member, said gearing being operative either manually or automatically, a rotatable ratchet wheel, a screw member movable in one direction to rotate said ratchet wheel in a clockwise direction and movable in the opposite direction to rotate the ratchet wheel in a counterclockwise direction, and means cooperating with said gearing and ratchet wheel constituting a driving connection from the ratchet wheel to the gearing to effect the automatic operation of the gearing when the ratchet wheel is rotated in the clockwise direction, said means permitting relative rotary movement between the ratchet wheel and gearing when the ratchet wheel is rotated in the counterclockwise direction or when the gearing is operated manually.

4. In a brake slack adjuster, in combination, a movable slack adjuster member, means cooperating with said member and operative to actuate said member to take up slack, a ratchet mechanism for actuating said means, said ratchet mechanism comprising a rotatable ratchet wheel and a pawl cooperating with the ratchet wheel and means, a rod movable back and forth in the direction of its length through said ratchet wheel and having a screw thread cooperating with the ratchet wheel to rotate the ratchet wheel in a counterclockwise direction when the rod is moved in one direction and to rotate the ratchet wheel in a clockwise direction when the rod is moved in the opposite direction, said pawl acting to transmit rotary motion from the ratchet wheel to said means only when the ratchet wheel is rotated in the clockwise direction.

5. In a brake slack adjuster, in combination, a movable slack adjuster member, means for moving said member to take up slack, and a mechanism for actuating said means, said mechanism comprising a rotatable ratchet wheel, a piston, a piston rod extending through a central opening in said ratchet wheel and having a screw thread in engagement with the ratchet wheel adapted to drive the ratchet wheel in a counterclockwise direction when the rod is moved longitudinally in one direction and to drive the ratchet wheel in a clockwise direction when the piston rod is moved longitudinally in the opposite direction, and means forming a driving connection from the ratchet wheel to said means only when the ratchet wheel is driven in the clockwise direction.

6. In a brake slack adjuster, in combination, a movable slack adjuster member, means for moving said member to take up slack, and a mechanism for actuating said means, said mechanism comprising a rotatable ratchet wheel, a piston, a piston rod extending through a central opening in said ratchet wheel and having a screw thread in engagement with the ratchet wheel adapted to drive the ratchet wheel in a counterclockwise direction when the rod is moved longitudinally in one direction and to drive the ratchet wheel in a clockwise direction when the piston rod is moved longitudinally in the opposite direction, means for preventing the piston rod from rotating as it is moved, and means forming a driving connection from the ratchet wheel to the first mentioned means only when the ratchet wheel is driven in the clockwise direction.

7. In a brake slack adjuster, a slack adjuster screw movable longitudinally in one direction to take up slack and movable longitudinally in the opposite direction toward a reset position, a member cooperating with said screw and rotatable in one direction to move the screw to take up slack and rotatable in the opposite direction to move the screw toward the reset position, and a mechanism operable upon effecting an application of the brakes and the subsequent release thereof to rotate said member to take up slack, said mechanism comprising a gearing for rotating said member, a rotatable ratchet wheel, a pawl forming a driving connection from the ratchet wheel to the gearing when the ratchet wheel is rotated in one direction, a piston, a piston rod rotatably connected with said piston and having a screw thread driving connection with the ratchet wheel, means locking said piston rod against rotation relative to the piston to render the driving connection between the piston rod and ratchet wheel effective to rotate the ratchet wheel and being movable out of locking relation with the piston rod to permit the piston rod to rotate relative to the piston and thereby permit the member and gearing to be rotated to reset the adjuster screw.

8. In a brake slack adjuster, in combination, slack take-up means operative automatically in one direction to take up slack and operative in the opposite direction to a reset position, mechanism comprising a piston and a piston stem operable upon effecting an application of the brakes and the subsequent release thereof for automatically operating the take-up means to take up slack, said stem in its normal brake release position being axially rotatable relative to the piston, and means operative upon the initial movement of the mechanism in the slack take-up cycle of operation for locking said stem against rotation to condition the mechanism for operation to take up slack and operable as the mechanism completes its slack take-up cycle of operation for unlocking said stem to condition the mechanism to permit the slack take-up means to be moved to said reset position.

9. In a brake slack adjuster, in combination, slack take-up means operative automatically in one direction to take up slack and operative in the opposite direction to a reset position, mechanism comprising a piston and a piston stem operable upon effecting an application of the brakes and the subsequent release thereof for automatically operating the take-up means to take up slack, said piston stem in its normal brake release position being axially rotatable relative to the piston, and clutch means operative upon the initial movement of the mechanism in the slack take-up cycle of operation for locking the piston stem against rotation to condition the mechanism to take up slack and operable as the mechanism completes its slack take-up cycle of operation for unlocking the piston stem to condition the mechanism to permit the operation of the slack take-up means to said reset position.

10. In a brake slack adjuster, in combination, slack take-up means operative automatically in one direction to take up slack and operative in the opposite direction to a reset position, mechanism operable upon effecting an application of the brakes and the subsequent release thereof for automatically operating the take-up means to take up slack, a stationary clutch member, and a rotatable clutch member movable into locking engagement with said stationary clutch member upon the initial movement of the mechanism in its slack take-up cycle of operation to lock the rotatable clutch member against rotation and thereby render the mechanism effective to take up slack and operative out of locking engagement with the stationary clutch member as the mechanism completes its slack take-up cycle of operation.

11. In a brake slack adjuster, in combination, slack take-up means operative automatically in one direction to take up slack and operative in the opposite direction to a reset position, mechanism operable upon effecting an application of the brakes and the subsequent release thereof for automatically operating the take-up means to take up slack, a stationary clutch member, a rotatable clutch member movable into locking engagement with said stationary clutch member upon the initial movement of the mechanism in its slack take-up cycle of operation to lock the rotatable clutch member against rotation and thereby render the mechanism effective to take up slack and operative out of locking engagement with the stationary clutch member as the mechanism completes its slack take-up cycle of operation, means controlled by said mechanism for moving the movable clutch member into locking engagement with the stationary clutch member, and means included in said mechanism for moving the movable clutch member out of locking engagement with the stationary clutch member.

12. In a brake slack adjuster, in combination, slack take-up means operative automatically in one direction to take up slack and operative in the opposite direction to a reset position, mechanism operable upon effecting an application of the brakes and the subsequent release thereof for automatically operating the take-up means to take up slack, a stationary clutch member, a rotatable clutch member movable into locking engagement with said stationary clutch member upon the initial movement of the mechanism in its slack take-up cycle of operation to lock the rotatable clutch member against rotation and thereby render the mechanism effective to take up slack and operative out of locking engagement with the stationary clutch member as the mechanism completes its slack take-up cycle of operation, resilient means for moving the movable clutch member into locking engagement with the stationary clutch member, and means included in said mechanism for moving the movable clutch member out of locking engagement with the stationary clutch member.

13. In a brake slack adjuster, a slack adjuster screw movable longitudinally in one direction to take up slack and movable longitudinally in the opposite direction toward a reset position, a member cooperating with said screw and rotatable in one direction to move the screw to take up slack and rotatable in the opposite direction to move the screw toward the reset position, and a mechanism operable upon effecting an application of the brakes and the subsequent release thereof to rotate said member to take up slack, said mechanism comprising a gearing for rotating said member, a rotatable ratchet wheel, a pawl forming a driving connection from the ratchet wheel to the gearing when the ratchet wheel is rotated in one direction, a piston, a piston rod rotatably connected with said piston and having a screw thread driving connection with the ratchet wheel, and means operable upon the initial operation of said piston in the take-up cycle of operation to lock the piston rod against rotation relative to the piston to render the driving connection between the piston rod and ratchet wheel effective to rotate the ratchet wheel, and operative to unlock the piston rod as said mechanism completes its take-up cycle of operation.

14. In a brake slack adjuster, a slack adjuster screw movable longitudinally in one direction to take up slack and movable longitudinally in the opposite direction toward a reset position, a member cooperating with said screw and rotatable in one direction to move the screw to take up slack and rotatable in the opposite direction to move the screw toward the reset position, and a mechanism operable upon effecting an application of the brakes and the subsequent release thereof to rotate said member to take up slack, said mechanism comprising a gearing for rotating said member, a rotatable ratchet wheel, a pawl forming a driving connection from the ratchet wheel to the gearing when the ratchet wheel is rotated in one direction, a piston, a piston rod rotatably connected with said piston and having a screw thread driving connection with the ratchet wheel, means operable upon the initial operation of said piston in the take-up cycle of operation to lock the piston rod against rotation relative to the piston to render the driving connection between the piston rod and ratchet wheel effective to rotate the ratchet wheel, and operative by the piston rod to unlock the piston rod as said mechanism completes its take-up cycle of operation.

WILLIAM GIRSCHT.